United States Patent
Seetharama et al.

(10) Patent No.: US 9,471,696 B2
(45) Date of Patent: Oct. 18, 2016

(54) METHODS AND SYSTEMS FOR PATHING ANALYSIS

(75) Inventors: Gururaj Seetharama, Bangalore (IN); Shaji Illias Chennan Kunnummel, Kozhokode (IN)

(73) Assignee: Yahoo! Inc., Sunnyvale, CA (US)

( * ) Notice: Subject to any disclaimer, the term of this patent is extended or adjusted under 35 U.S.C. 154(b) by 1101 days.

(21) Appl. No.: 12/945,653

(22) Filed: Nov. 12, 2010

(65) Prior Publication Data
US 2012/0124030 A1 May 17, 2012

(51) Int. Cl.
| | | |
|---|---|---|
| *G06F 15/173* | (2006.01) | |
| *G06F 17/30* | (2006.01) | |
| *G06F 3/06* | (2006.01) | |
| *G06F 12/08* | (2016.01) | |
| *G06F 11/10* | (2006.01) | |

(52) U.S. Cl.
CPC ......... *G06F 17/30876* (2013.01); *G06F 3/067* (2013.01); *G06F 11/1076* (2013.01); *G06F 12/0813* (2013.01); *G06F 17/30442* (2013.01); *G06F 17/30463* (2013.01); *G06F 17/30477* (2013.01); *G06F 17/30864* (2013.01)

(58) Field of Classification Search
CPC ............. G06F 3/067; G06F 17/30864; G06F 11/1076; G06F 12/0813; G06F 17/30442; G06F 17/30463; G06F 17/30477; G06F 17/30876

USPC .................................. 709/221–225, 238–253
See application file for complete search history.

(56) References Cited

U.S. PATENT DOCUMENTS

| | | | | |
|---|---|---|---|---|
| 6,158,022 | A  * | 12/2000 | Avidan ........................... | 714/33 |
| 7,774,440 | B1 * | 8/2010 | Bagrodia et al. ............. | 709/221 |
| 2002/0118682 | A1* | 8/2002 | Choe ........................ | 370/395.31 |
| 2008/0195729 | A1* | 8/2008 | Chand et al. ................. | 709/224 |
| 2009/0063516 | A1* | 3/2009 | Wang et al. .................. | 707/100 |
| 2009/0097418 | A1* | 4/2009 | Castillo et al. ............... | 370/255 |

\* cited by examiner

*Primary Examiner* — Chris Parry
*Assistant Examiner* — Weiwei Stiltner
(74) *Attorney, Agent, or Firm* — Mauriel Kapouytian Woods LLP; Serge Krimnus; James Woods

(57) ABSTRACT

Methods, systems and computer program products for pathing analysis are provided. The method includes receiving at a server, a query comprising one or more nodes. The method further includes identifying one or more prior queries, wherein the one or more prior queries comprise at least one of the one or more nodes. The method accesses metadata associated with the one or more prior queries. The method then selects based on the metadata, one or more data partitions for further processing. Next, the method causes one or more computers to identify one or more paths in the selected data partitions, wherein the one or more paths comprise at least the one or more nodes. Finally, the method presents the identified paths as an output to the query.

21 Claims, 6 Drawing Sheets

| Node combinations | Prior queries |
| --- | --- |
| SRC | SRC – A – B – C |
| | SRC – A – B – C – D |
| | SRC – B – D |
| SRC, DST | SRC – A – DST |
| | SRC – A – B – DST |
| | SRC – B – D – DST |
| SRC, VIA, DST | SRC – VIA – DST |
| | SRC – A – VIA – B – DST |
| | SRC – A – B – VIA – C – DST |

| Prior query (402) | Data partition identifier (404) | Number of unique paths (406) | Maximum frequency (408) | Minimum frequency (410) |
|---|---|---|---|---|
| A – B – C | P1 | 3 | 100 | 75 |
|  | P2 | 2 | 80 | 70 |
|  | P3 | 2 | 50 | 30 |
|  | P4 | 4 | 30 | 20 |
| A – D – C | P1 | 11 | 120 | 60 |
|  | P3 | 6 | 85 | 34 |
|  | P4 | 1 | 52 | 52 |
| B – D | P2 | 2 | 62 | 21 |
|  | P3 | 4 | 12 | 2 |

METHODS AND SYSTEMS FOR PATHING ANALYSIS

TECHNICAL FIELD

The present invention generally relates to analysis of node and path type data and more specifically to querying systems thereof.

BACKGROUND

Path analysis is a process of analyzing the formation of a path by a sequence of nodes. Path analysis is employed in various fields such as, but not limited to, internet website traffic analytics, protein sequencing, virus and malicious software detection algorithms, text analysis algorithms, and so forth. A path analysis system may accept a sequence or combination of nodes and identify paths that include the sequence or combination of nodes. For example, an internet website traffic analysis system may accept the source and destination web pages as input, and identify the various navigation patterns followed by visitors of the website to navigate from the source web page to the destination web page.

Path analysis may be characterized by analyzing large amounts of logged data. Such logged data includes, without limitation, web page access requests, protein molecules, virus signatures, linguistic constructs, and so forth. Indexing of the logged data may not be feasible, nor possible, due to the large amount of the logged data. Therefore, current path analysis systems may process the entire amount of logged data to identify pertinent paths based on the input node sequences or node combinations. This may require a significant amount of processing power. Path analysis, in Internet website analytics, is a process of determining a sequence of pages visited in a visitor session prior to some desired event, such as the visitor purchasing an item or requesting a newsletter. The precise order of pages visited may or may not be important and may or may not be specified. In practice, this analysis is done in aggregate, ranking the paths (sequences of pages) visited prior to the desired event, by descending frequency of use. The idea is to determine what features of the website encourage the desired result. "Fallout analysis," a subset of path analysis, looks at "black holes" on the site, or paths that lead to a dead end most frequently, paths or features that confuse or lose potential customers.

Some known implementations of path analysis systems utilize a distributed computing architecture. Such distributed computing architecture may provide the required amount of processing power. However, as the amount of logged data increases over time, proportional increases in the processing power may be required. This may incur additional costs for upgrading the distributed computing architecture.

Further, processing of the large amount of logged data may require that a significant amount of data be transferred back and forth between compute nodes within the distributed computing architecture. Again, as the amount of logged data increases, the data transfer links may need to be upgraded over time.

SUMMARY

In particular embodiments, the present invention provides methods, systems and computer program products for pathing analysis. Particular embodiments provide an efficient mechanism of caching meta-data generated from the history of pathing queries to improve the performance of a current submitted query. The method includes receiving at a server, a query comprising one or more nodes. The method further includes identifying one or more prior queries, wherein the one or more prior queries comprise at least one of the one or more nodes. The method accesses metadata associated with the one or more prior queries. The method then selects based on the metadata, one or more data partitions for further processing. Next, the method causes one or more computers to identify one or more paths in the selected data partitions, wherein the one or more paths comprise at least the one or more nodes. Finally, the method presents the identified paths as an output to the query.

BRIEF DESCRIPTION OF THE DRAWINGS

FIG. 3 illustrates an example hash map, according to one embodiment of the present invention;

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Example Network Environment

Figure 1:
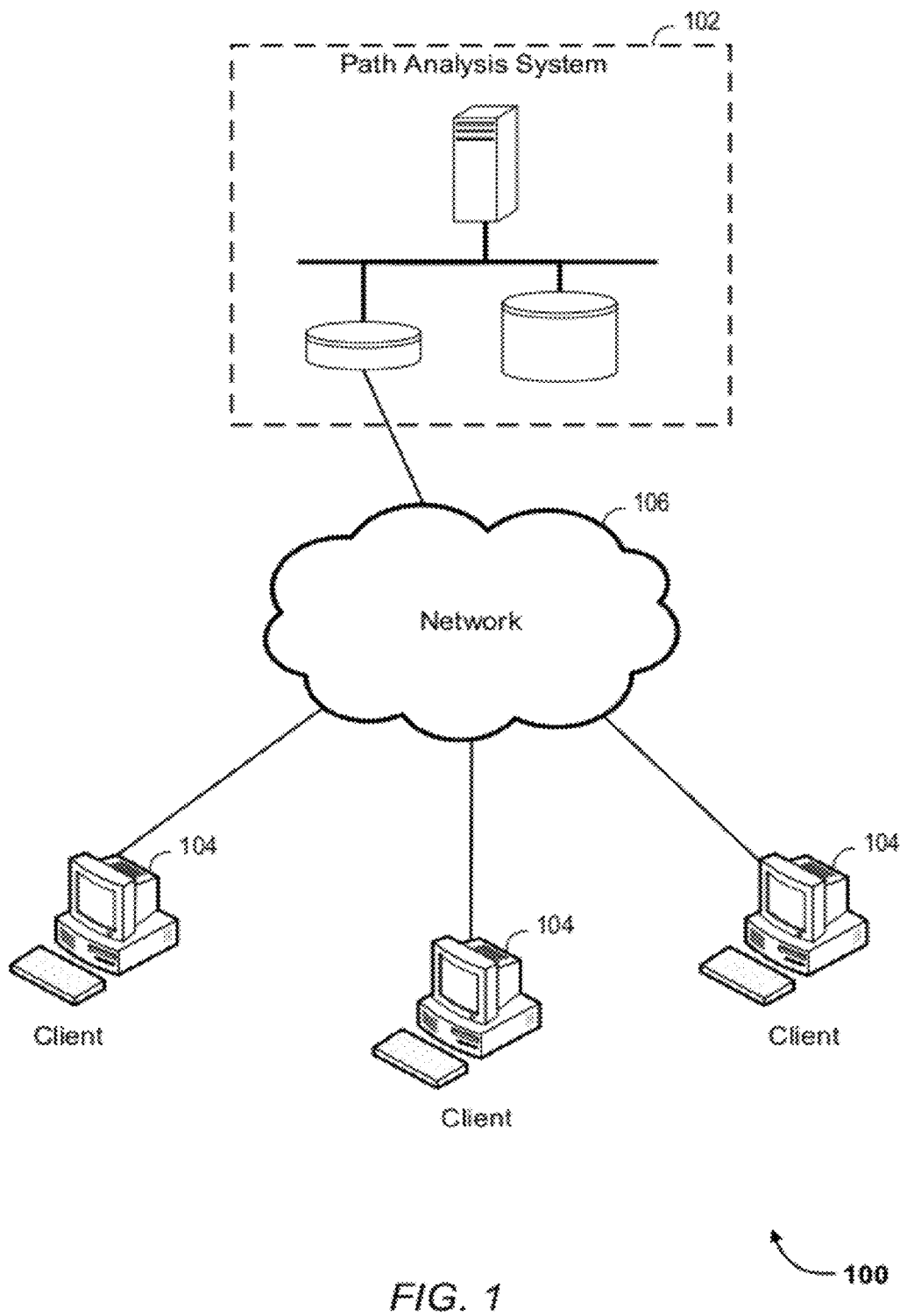
FIG. 1 illustrates an example environment in which a path analysis system may operate, according to one embodiment of the present invention.

FIG. 1 illustrates an example environment 100 in which embodiments of the present invention may operate, according to one embodiment. The environment 100 includes a path analysis system 102, one or more clients 104, and a network 106.

Path analysis system 102 may service queries expressed in the form of one or more nodes to retrieve one or more paths defined by the one or more nodes. One example pathing analysis system 102 may be implemented for analyzing internet website traffic. In such an implementation, the nodes may be web pages of interest and the paths may be the sequence in which users navigate through the web pages of interest. Another example pathing analysis system 102 may be implemented for matching or searching protein structures. In such an implementation, the nodes may be the molecules of a protein, and the paths may be the structure of the protein. Yet another example pathing analysis system 102 may be implemented for virus detection. In such an implementation, the nodes may be virus signatures or parts thereof, and the paths may be the byte pattern of a digital file being scanned for viruses. Further, such an implementation may also be used for detection of spyware and other malicious software. It will be appreciated that path analysis system 102 may be implemented in other scenarios as well, where a path defined by the one or more nodes is to be retrieved using the one or more nodes as the query.

According to one embodiment, path analysis system 102 may be implemented as a distributed computing system. The distributed computing system may facilitate the partitioning of a data set, and parallel processing of the partitions of the data set by a number of slave computers. Path analysis system 102 receives the queries from clients 104. Path analysis system 102 may then search a caching system to check if clients 104 had submitted the same or a similar query (referred to herein as "prior query") in the past. If path analysis system 102 determines that a prior query exists in the caching system, path analysis system 102 may leverage the output of the prior query to facilitate processing of the query. Path analysis system 102 is described in detail in conjunction with FIG. 2.

Clients

Client 104 is a computing device from which a user accesses path analysis system 102. Client 104 has the capability to communicate over network 106. Client 104 further has the capability to provide the user an interface to interact with path analysis system 102. Client 104 may be, for example, a desktop computer, a laptop computer, a thin client, and the like. Client 104 may execute one or more client applications such as, without limitation, a web browser to access and view content over a computer network, a query tool for constructing and submitting queries for path analysis, a path statistics tool for viewing results of pathing analysis queries, and report generation tools for generating reports for the results of pathing analysis.

Network

Network 106 generally represents one or more interconnected networks, over which path analysis system 102, and clients 104 can communicate with each other. Network 106 may include packet-based wide area networks (such as the Internet), local area networks (LAN), private networks, wireless networks, satellite networks, cellular networks, paging networks, and the like. A person skilled in the art will recognize that network 106 may also be a combination of more than one type of network. For example, network 106 may be a combination of a LAN and the Internet. In addition, network 106 may be implemented as a wired network, or a wireless network or a combination thereof. Clients 104 are communicatively coupled to network 106 via a network service provider or any other suitable methods known in the art.

Path Analysis System

Figure 2:
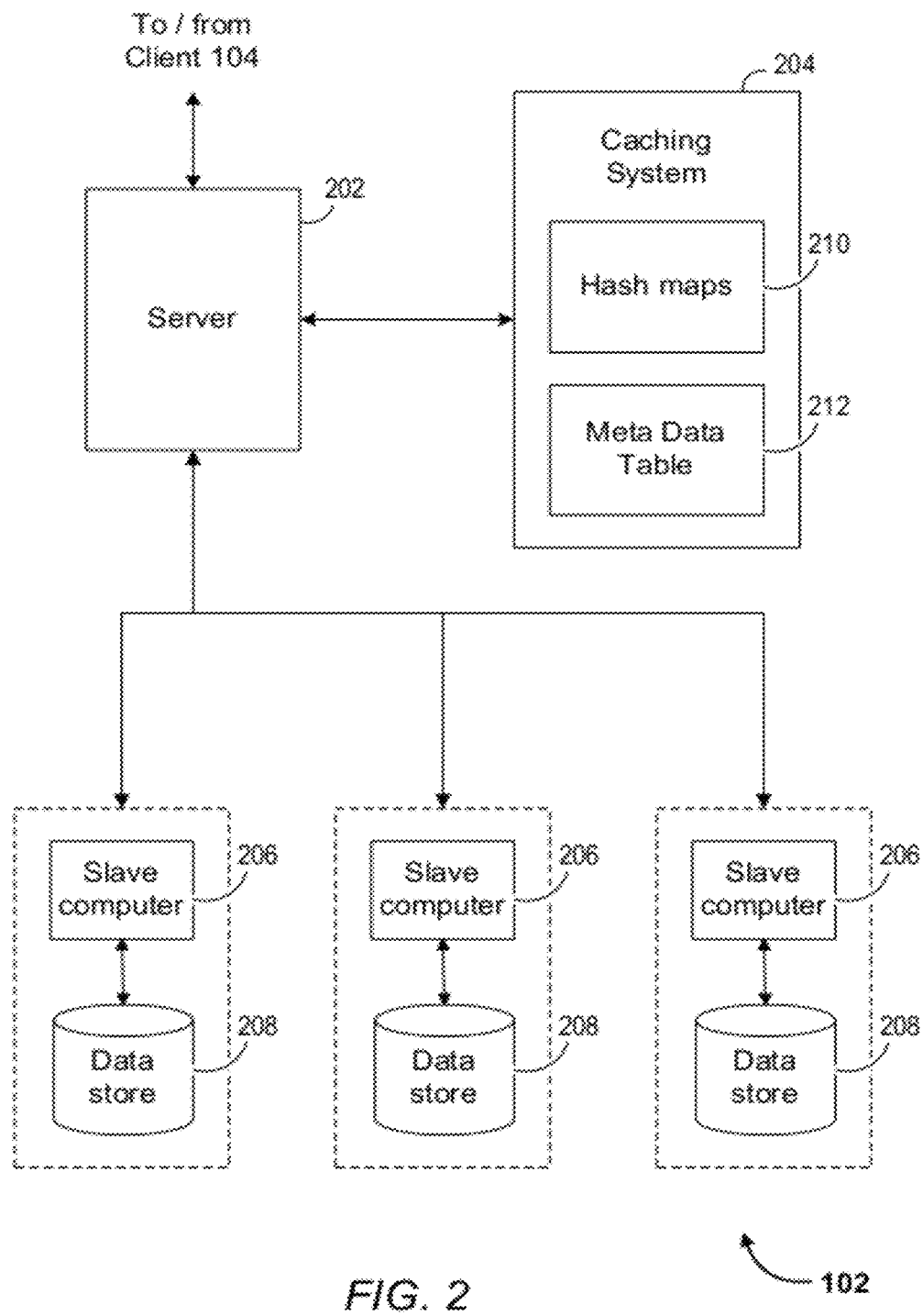
FIG. 2 illustrates an example path analysis system, according to one embodiment of the present invention.

FIG. 2 illustrates an example path analysis system 102, according to one embodiment of the present invention. Path analysis system 102 includes a server 202, a caching system 204, one or more slave computers 206, and one or more data stores 208. The caching system 204 may further include one or more hash maps 210, and one or more metadata tables 212.

Server 202 accepts the query from clients 104. The query may include one or more nodes. For example, the nodes may be web pages of a website, including without limitation, a source node, a destination node, and a via node. The source node may represent the originating web page of a user's navigation through a website. The destination node may represent the final web page that the user visits before navigating away from the website. The via node may represent the intermediate web pages that the user visits in the website between the originating web page and the final web page. The nodes may define one or more paths corresponding to a navigation pattern of the different web pages of the website.

In one implementation, server 202 may accept queries such as, "list all paths which start with a source node based on the number of visits"; "list all paths which start with a source node and end at a destination node based on the number of visits"; and "list all paths which start with a source node, end at a destination node and passing through one or more via nodes based on the number of visits. Each query may result in a number of node combinations. For example, a query "list all paths which start at nodes S1 or S2, pass through nodes V1 or V2, and end at nodes D1 or D2", would result in eight node combinations, such as (S1, V1, D1), (S1, V1, D2), (S1, V2, D1), (S1, V2, D2), (S2, V1, D1), (S2, V1, D2), (S2, V2, D1), and (S2, V2, D2). Server 202 may then query the caching system 204 using the node-level combinations. Upon receiving the query, server 202 may access caching system 204 to identify data partitions for processing.

In one implementation, path analysis system 102 utilizes a two-level partition structure to partition the data stored in data store 208. At a high-level partition, the data may be partitioned at the node-combination level. For example, if a query identifies source nodes as S1 or S2, via nodes as V1 or V2, and destination nodes D1 or D2, there would be eight high-level partitions at the node-combination level, such as (S1, V1, D1), (S1, V1, D2), (S1, V2, D1), (S1, V2, D2), (S2, V1, D1), (S2, V1, D2), (S2, V2, D1), and (S2, V2, D2). Each high-level partition may then be further partitioned into one or more low-level partitions, based on the path lengths. For example, for node combination (S1, V1, D1), there may be a low-level partition for path length of 3 nodes i.e. (S1-V1-D1); another low-level partition for path length of 4 nodes such as (S1-V1-X-D1), (S1-Y-V1-D1), and so forth. Partition identifiers of the data partitions may be stored at caching system 204.

Caching system 204 may include information corresponding to prior queries serviced by server 202. Such information may include, without limitation, node combinations, prior queries including the node combinations, partition identifiers of one or more data partitions, frequency of occurrence of one or more paths including the node combinations, and so forth. In one embodiment, caching system 204 may store such information in the hash maps 210 and the metadata tables 212.

Hash map 210 may include information to identify prior queries that include the node combination received in the query. In one embodiment, hash map 210 includes a list of node combinations, and the prior queries that include the node combinations. In the example implementation of path analysis system 102 for website traffic monitoring, caching system 204 may include hash map 210 for each node combination. For example, caching system 204 may include a source hash map including a list of nodes, and the prior queries that include the listed nodes as source nodes; a source-destination hash map including a list of ordered node pairs, and the prior queries that include the node pairs as source and destination nodes respectively; and a source-via-destination hash map including a list of ordered node combinations, and the prior queries that include the node combinations as source, via, and destination nodes respectively. In one embodiment, hash maps 210 may store the prior queries as unique hash values. In another embodiment, hash maps 210 may store the prior queries as unique identifiers. An example hash map 210 is illustrated in FIG. 3.

Metadata tables 212 may include information associated with each prior query. Such information may include, without limitation, a list of prior queries, data partition identifiers, a number of unique paths including the node combination, a maximum frequency associated with a first unique path including the node combination, and a minimum frequency associated with a second unique path including the node combination. Such information may be stored in the form of a tuple, where each tuple may comprise the partition identifier, total number of node-combinations or high level partitions output subsequent to processing of the data partition, a maximum frequency associated with a first unique path including the node combination, and a minimum frequency associated with a second unique path including the node combination. As explained in the preceding paragraphs, a query such as source node=S1 or S2, via node=V1 or V2, and destination node=D1 or D2, will have eight different node combinations. In this case, metadata tables 212 includes a distinct tuple for each of the eight different node combinations. Each tuple may have a unique identifier or a unique hash value associated therewith. The unique identifier or unique hash value may be inserted into hash map 210. For a prior query including a source node, a destination node, and a via node, the unique identifier or unique hash value may be inserted in all three hash maps 210 i.e. the source-via-destination hash map, the source-destination hash map, and the source hash map. For a prior query including a source node and a destination node, the unique identifier or unique hash value may be inserted in two hash maps 210 i.e. the source-destination hash map, and the source hash map.

Figure 4:
FIG. 4 illustrates an example metadata table, according to one embodiment of the present invention.

Every time server 202 receives a query, caching system 204 may update hash maps 210 and metadata tables 212 for future queries. An example metadata table 212 is illustrated in FIG. 4

Hash map 210 and metadata tables 212 together provide a two-level partitioning of data stored in data store 208. Hash maps 210 define high level partitions on the node combination level, while metadata tables 212 define low level partitions based on path length. Upon receiving a request from server 202, caching system 204 may access first access hash maps 210 and identify one or more high level partitions based on the node combination included in the query. Caching system 204 may then access metadata tables 212 to identify one or more low level partitions based on the prior queries identified using hash map 210. Thus, by accessing hash map 210 and metadata tables 212, caching system 204 identifies data partitions, which upon processing, may collectively yield a predefined number of most frequently occurring paths. Caching system 204 may then transfer the partition identifiers to server 202. In one embodiment, caching system 204 may order the partition identifiers to generate a processing order list. The processing order list may define the order in which slave computers 206 may process the data partitions to identify the predefined number of most frequently occurring paths. The processing may be terminated when the predefined number of most frequently occurring paths is identified.

Server 202 may then transfer the partition identifiers and/or the processing order list to slave computers 206, for further processing. Slave computer 206 may then process the data stored in data stores 208. Slave computer 206 may process only the data partitions associated with the received partition identifiers. In one embodiment, slave computer 206 may process the data partitions associated with the received partition identifiers in the order defined in the processing order list.

Slave computers 206 may process the selected data partitions using any suitable processing techniques for pathing analysis, to identify one or more frequently occurring paths. Slave computers 206 may then transfer the identified paths to server 202. Server 202 may then consolidate the frequently occurring paths received from each of the slave computers 206 and present the consolidated list of frequently occurring paths as output to the query. In one embodiment, server 202 may select a predefined number of most frequently occurring paths from the consolidated list, and present the selected paths as output to the query.

Hash Map

FIG. 3 illustrates an exemplary hash map 300 according to one embodiment of the present invention. Hash map 300 includes a list of node combinations 302, and hash values 304 of prior queries that include the corresponding node combinations.

Metadata Table

FIG. 4 illustrates an exemplary metadata table 400 according to one embodiment of the present invention. Metadata table 400 includes a list of prior queries 402, data partition identifiers 404, a number of unique paths including the node combination 406, a maximum frequency 408 associated with a first unique path including the node combination, and a minimum frequency 410 associated with a second unique path including the node combination.

Path Analysis

Figure 5:
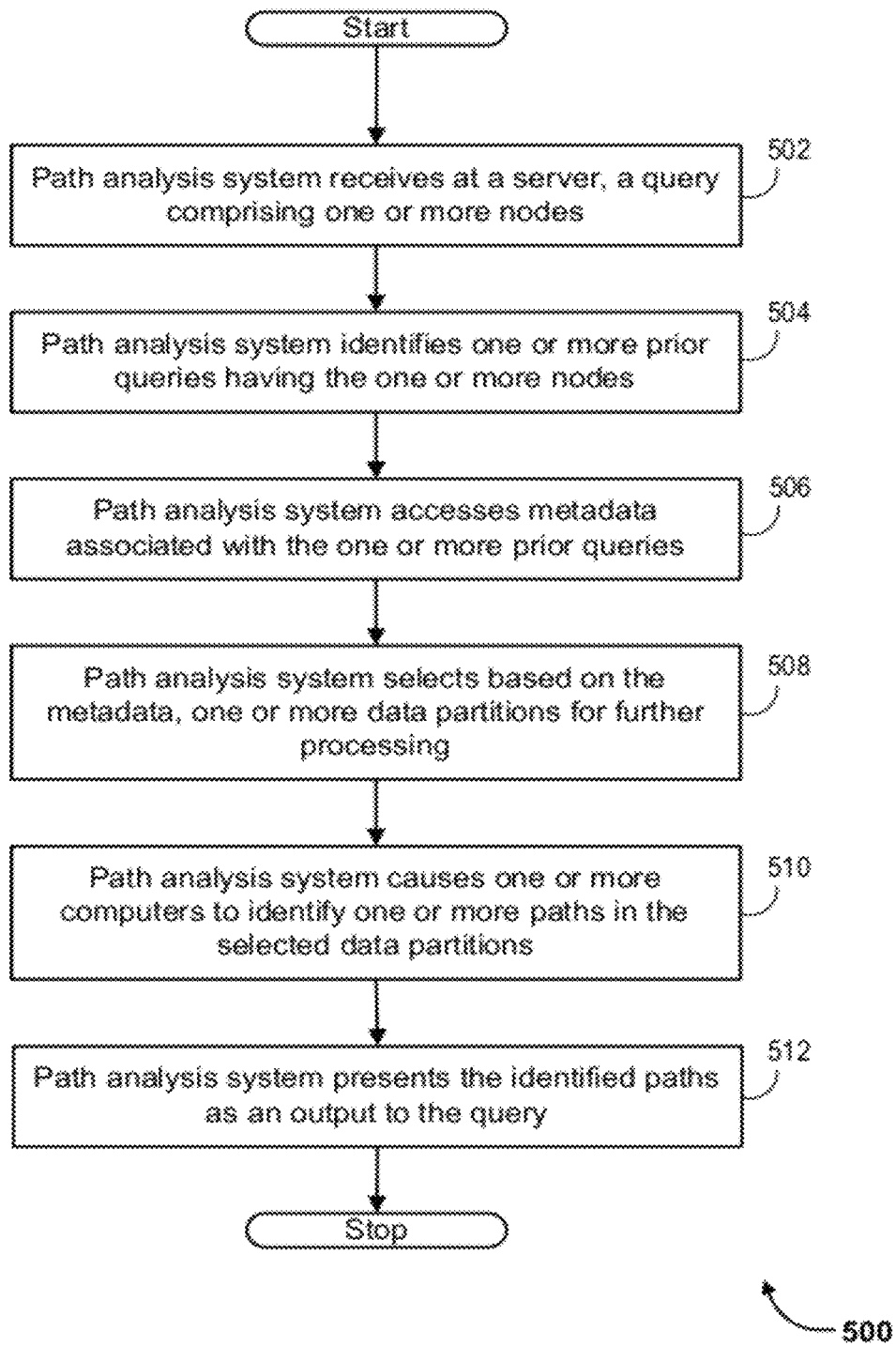
FIG. 5 illustrates an example process for path analysis, according to one embodiment of the present invention.
Figure 6:
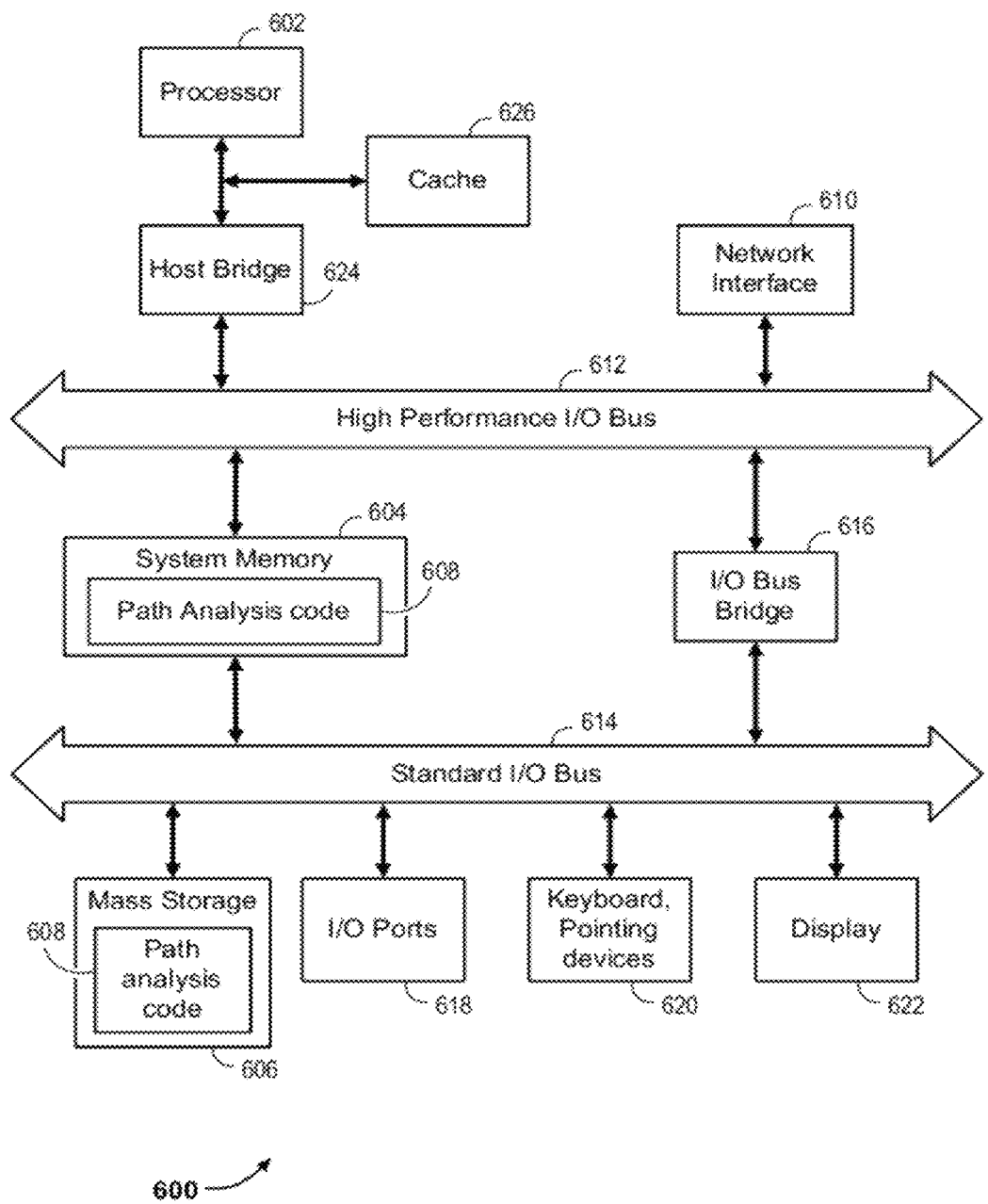
FIG. 6 is a schematic diagram illustrating an example computing system for generating one or more personalized identifiers according to one embodiment.

FIG. 5 is a flowchart illustrating an example process for path analysis, according to one embodiment of the present invention. At step 502, path analysis system 102 receives a query. The query includes one or more nodes. For example, the query may include a source node, a via node, and a destination node representing web pages in a user's navigation pattern through a website.

At step 504, path analysis system 102 identifies one or more prior queries, that have at least one of the nodes included in the received query. In other words, path analysis system identifies prior queries somewhat or exactly similar to the received query. As described in conjunction with FIG. 2, a server 202 may access caching system 204 to identify prior queries from the hash maps 210 stored thereon. Server 202 may parse the query into a node combination, and transfer it to caching system 204. Caching system 204 may then use the node combination to search for prior queries that include one or more nodes included in the node combination. Caching system 204 may return prior queries if found in hash maps 210. In one embodiment, hash maps 210 may store the prior queries as unique hash values. Caching system 204 may then use the unique hash values (or prior queries, depending on the implementation) to access metadata associated with the prior queries.

For example, caching system 204 may first access the source hash map and search for prior queries including the source node. If no such prior queries are found, caching system 204 may indicate to server 202 that the received query is a new query, and terminate the process. Caching system 204 may then access the source-destination hash map, and search for the source node, and the destination node in that order. If no prior queries including the destination node are found, caching system 204 may indicate to server 202 that the received query is a relaxed query. In other words, the received query may not have an exact match in the prior queries, but a partial match with one or more prior queries is possible. If prior queries including both the source node and the destination are found, and are the same as the prior queries found from the source hash map, caching system 202 may indicate to server 202 that the received query is a relaxed query. Finally, caching system 204 may access the source-via-destination hash map, and search for the source node, the via node, and the destination node. If prior queries including the source node, the via node, and the destination node are found from the source-via-destination hash map, and are the same as the prior queries found from the source-destination hash map, caching system 204 may indicate to server 202 that the received query is an exact match to a prior query. Caching system 204 may then utilize the exact match prior query or partial match prior queries to access metadata tables 210.

At step 506, path analysis system 102 accesses metadata associated with the prior queries. The metadata associated with the prior queries includes, without limitation, data partition identifiers, a number of unique paths including the node combination, a maximum frequency associated with a first unique path including the node combination, and a minimum frequency associated with a second unique path including the node combination. As described in conjunction with FIG. 2, caching system 204 may access metadata tables 212 using the identified prior queries. Caching system 204 may retrieve the metadata from metadata tables 210 for further processing.

At step 508, path analysis system 102 selects based on the metadata, one or more data partitions for further processing. In one embodiment, caching system 204 may analyze frequency of the least frequently occurring paths for each prior query. Caching system 204 may then designate the maximum frequency among these as a threshold. Caching system 204 may then compare the frequencies of the most frequently occurring paths for each query with the threshold. Caching system 204 may append data partition identifiers corresponding to the most frequently occurring paths whose frequency exceeds the threshold. In other words, caching system 204 may select the data partitions that include the most frequently occurring paths.

For example, with reference to FIG. 4, caching system 204 may analyze the frequency of least frequently occurring paths 410. Caching system 204 identifies 75 as the maximum frequency among the least frequently occurring paths 410 with respect to prior query A-B-C, and sets it as the threshold. Caching system 204 then compares the frequency of the most frequently occurring paths for prior query A-B-C, and identifies partitions P1 and P2 as exceeding the threshold, and selects partitions P1 and P2 for further processing.

In one embodiment, caching system 204 may order the selected data partitions into a processing order list. The processing order list may define the order in which slave computers 206 may process the data partitions to identify the predefined number of most frequently occurring paths.

At step 510 path analysis system 102 causes one or more computers to identify one or more paths in the selected data partitions. The paths include at least the nodes included in the query. As described in FIG. 2, server 202 may cause slave computers 206 to process the selected data partitions and identify one or more paths that include the nodes in the query. The identified paths may or may not include other nodes. Slave computers 206 may use any known technique to process the data partitions and identify the one or more paths. In one embodiment, slave computers 206 may process the data partitions in the order defined in the processing order list. After a data partition has been processed, slave computers 206 may transfer the identified paths to server 202.

At step 512 path analysis system 102 presents the identified paths as an output to the query. In one embodiment, server 202 selects a predefined number of most frequently occurring paths from the identified paths. One example implementation of a process for selecting the predefined number of most frequently occurring paths is described below.

Server 202 receives the identified paths after the selected data partitions are processed by all slave computers 206. Server 202 may thus have lists of identified paths for each of the selected data partition from each slave computer 206. Server 202 may receive frequency of occurrence of each identified path. Server 202 may then consolidate the lists for each data partition from all slave computers 206, and determine total frequencies of occurrence of each identified path. Server 202 may also determine a mean of the total frequencies of occurrence for each data partition. In some embodiments, server 202 may also determine a logarithm of the variance of the frequencies of occurrence for each data partition.

Server 202 may then select a first data partition. The first data partition is the data partition with the highest mean of the total frequencies of occurrence. Server 202 may then append into a top results list, the identified paths of the first data partition whose frequency of occurrence exceeds the highest frequency of occurrence of any identified path in the other data partitions. Server 202 may then repeat the selection process for the remaining data partitions, till the predefined number of most frequently occurring paths is included in the top results list. Server 202 may then present the top result list as an output to the query.

Path Analysis System Architecture

FIG. 7 illustrates an example hardware system 600 to implement path analysis system 102 according to one embodiment. Hardware system 600 includes at least one processor 602, a system memory 604, and mass storage 606. The system memory 604 has stored therein one or more application software, programming instructions for implementing path analysis system 608, an operating system and drivers directed to the functions described herein. Mass storage 606 provides permanent storage for the data and programming instructions for path analysis system 608, whereas system memory 604 (e.g., DRAM) provides temporary storage for the data and programming instructions when executed by processor 602. The process flow of the programming instructions for path analysis system 102 is described in detail in conjunction with FIG. 3. In one embodiment, hash maps 210 and metadata tables 212 may reside in mass storage 606. A network/communication interface 610 provides communication between hardware system 600 and any of a wide range of networks, such as an Ethernet (e.g., IEEE 802.3) network, etc. Additionally, hardware system 600 includes a high performance input/output (I/O) bus 612 and a standard I/O bus 614. System memory 604 and network/communication interface 610 couple to bus 612. Mass storage 606 couple to bus 614. I/O Bus Bridge 616 couples the two buses 612 and 614 to each other.

In one embodiment, path analysis process 300 described herein is implemented as a series of software routines run by hardware system 600. These software routines comprise a plurality or series of instructions to be executed by a processor in a hardware system, such as processor 602. Initially, the series of instructions are stored on a storage device, such as mass storage 606. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 610. The instructions are copied from the storage device, such as mass storage 606, into system memory 604 and then accessed and executed by processor 602.

In one embodiment, hardware system 600 may also include I/O ports 618, a keyboard and pointing device 620, a display 622 coupled to bus 612. I/O ports 618 are one or more serial and/or parallel communication ports that provide communication between additional peripheral devices, which may be coupled to hardware system 600. A host bridge 624 couples processor 602 to high performance I/O bus 610. Hardware system 600 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 600 may include a variety of system architectures; and various components of hardware system 600 may be rearranged. For example, cache 626 may be on-chip with processor 602. Alternatively, cache 626 and processor 602 may be packed together as a "processor module," with processor 602 being referred to as the "processor core." Furthermore, certain embodiments of the present invention may not require nor include all of the above components. For example, the peripheral devices shown coupled to standard I/O bus 612 may couple to high performance I/O bus 610. In addition, in some embodiments only a single bus may exist with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method for pathing analysis, the method comprising:
receiving, at a server, a query identifying one or more nodes;
identifying one or more prior queries that include at least one of the one or more nodes;
accessing metadata associated with the one or more prior queries;
selecting, based on the metadata, one or more data partitions for further processing by determining a first plurality of frequencies, the first plurality of frequencies comprising a frequency of a least frequently occurring path associated with each of a second one or more data partitions, determining a second plurality of frequencies, the second plurality of frequencies comprising a frequency of a most frequently occurring path associated with each of the second one or more data partitions, determining a lowest frequency of the first plurality of frequencies, and selecting the one or more data partitions, wherein a frequency of the second plurality of frequencies associated with each of the one or more data partitions is greater than the lowest frequency of the first plurality of frequencies;
causing one or more computers to identify one or more paths in the selected data partitions, wherein the one or more paths comprise at least the one or more nodes; and
presenting the identified paths as an output to the query.

2. The method of claim 1 wherein identifying the one or more prior queries comprises searching one or more hash maps associated with the one or more nodes.

3. The method of claim 2 further comprising updating the one or more hash maps associated with the one or more nodes.

4. The method of claim 1 wherein the metadata comprises one or more of an identifier of a data partition, a number of unique paths comprising at least the one or more nodes, a maximum frequency associated with a first unique path, and a minimum frequency associated with a second unique path.

5. The method of claim 1 further comprising ordering the selected data partitions to form a processing order.

6. The method of claim 1 wherein causing the one or more computers to identify the one or more paths comprises transferring a processing order of the selected data partitions to the one or more computers.

7. The method of claim 1 further comprising storing metadata associated with the query.

8. A system for path analysis, the system comprising:
one or more network interfaces;
at least one processor;
a memory; and
computer program code stored in a computer readable storage medium, wherein the computer program code, when executed, is operative to cause the at least one processor to:
receive at a server, a query comprising one or more nodes;
identify one or more prior queries, wherein the one or more prior queries comprise at least one of the one or more nodes;
access metadata associated with the one or more prior queries;
select based on the metadata, one or more data partitions for further processing by determining a first plurality of frequencies, the first plurality of frequencies comprising a frequency of a least frequently occurring path associated with each of a second one or more data partitions, determining a second plurality of frequencies, the second plurality of frequencies comprising a frequency of a most frequently occurring path associated with each of the second one or more data partitions, determining a lowest frequency of the first plurality of frequencies, and selecting the one or more data partitions, wherein a frequency of the second plurality of frequencies associated with each of the one or more data partitions is greater than the lowest frequency of the first plurality of frequencies;

cause one or more computers to identify one or more paths in the selected data partitions, wherein the one or more paths comprise at least the one or more nodes; and present the identified paths as an output to the query.

9. The system of claim 8, wherein the computer program code is further operative to cause the at least one processor to identify the one or more prior queries comprises searching one or more hash maps associated with the one or more nodes.

10. The system of claim 9, wherein the computer program code is further operative to cause the at least one processor to update the one or more hash maps associated with the one or more nodes.

11. The system of claim 8 wherein the metadata comprises one or more of an identifier of a data partition, a number of unique paths comprising at least the one or more nodes, a maximum frequency associated with a first unique path, and a minimum frequency associated with a second unique path.

12. The system of claim 8, wherein the computer program code is further operative to cause the at least one processor to order the selected data partitions to form a processing order.

13. The system of claim 8, wherein the computer program code is further operative to cause the at least one processor to transfer a processing order of the selected data partitions to the one or more computers.

14. The system of claim 8, wherein the computer program code is further operative to cause the at least one processor to store metadata associated with the query.

15. One or more computer-readable non-transitory storage media embodying software operable when executed by one or more computer systems to:

receive at a server, a query comprising one or more nodes;

identify one or more prior queries, wherein the one or more prior queries comprise at least one of the one or more nodes;

access metadata associated with the one or more prior queries;

select based on the metadata, one or more data partitions for further processing by determining a first plurality of frequencies, the first plurality of frequencies comprising a frequency of a least frequently occurring path associated with each of a second one or more data partitions, determining a second plurality of frequencies, the second plurality of frequencies comprising a frequency of a most frequently occurring path associated with each of the second one or more data partitions, determining a lowest frequency of the first plurality of frequencies, and selecting the one or more data partitions, wherein a frequency of the second plurality of frequencies associated with each of the one or more data partitions is greater than the lowest frequency of the first plurality of frequencies;

cause one or more computers to identify one or more paths in the selected data partitions, wherein the one or more paths comprise at least the one or more nodes; and present the identified paths as an output to the query.

16. The computer-readable non-transitory storage media of claim 15 further embodying software operable when executed by one or more computer systems to identify the one or more prior queries comprises searching one or more hash maps associated with the one or more nodes.

17. The computer-readable non-transitory storage media of claim 16 further embodying software operable when executed by one or more computer systems to update the one or more hash maps associated with the one or more nodes.

18. The computer-readable non-transitory storage media of claim 15 wherein the metadata comprises one or more of an identifier of a data partition, a number of unique paths comprising at least the one or more nodes, a maximum frequency associated with a first unique path, and a minimum frequency associated with a second unique path.

19. The computer-readable non-transitory storage media of claim 15 further embodying software operable when executed by one or more computer systems to order the selected data partitions to form a processing order.

20. The computer-readable non-transitory storage media of claim 15 further embodying software operable when executed by one or more computer systems to transfer a processing order of the selected data partitions to the one or more computers.

21. The computer-readable non-transitory storage media of claim 15 further embodying software operable when executed by one or more computer systems to cause the at least one processor to store metadata associated with the query.

* * * * *